United States Patent
Ramos et al.

(10) Patent No.: US 11,270,211 B2
(45) Date of Patent: Mar. 8, 2022

(54) INTERACTIVE SEMANTIC DATA EXPLORATION FOR ERROR DISCOVERY

(71) Applicant: Microsoft Technology Licensing, LLC, Redmond, WA (US)

(72) Inventors: Gonzalo A Ramos, Kirkland, WA (US); Jin A Suh, Seattle, WA (US); Johannes H Verwey, Seattle, WA (US); Patrice Y Simard, Clyde Hill, WA (US); Steven M Drucker, Bellevue, WA (US); Nan-Chen Chen, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1041 days.

(21) Appl. No.: 15/889,023

(22) Filed: Feb. 5, 2018

(65) Prior Publication Data

US 2019/0244113 A1 Aug. 8, 2019

(51) Int. Cl.
*G06F 3/0481* (2013.01)
*G06N 5/02* (2006.01)
*G06F 3/04842* (2022.01)
*G06F 3/04847* (2022.01)

(52) U.S. Cl.
CPC ............ *G06N 5/02* (2013.01); *G06F 3/0481* (2013.01); *G06F 3/04842* (2013.01); *G06F 3/04847* (2013.01)

(58) Field of Classification Search
CPC ...... G06N 5/02; G06F 3/0481; G06F 3/04842
See application file for complete search history.

(56) References Cited

U.S. PATENT DOCUMENTS 6,560,597 B1  5/2003  Dhillon et al.
8,185,638 B2 *  5/2012  Appelman .............. H04L 51/28
                                           709/227

(Continued)

OTHER PUBLICATIONS

Ben Shneiderman, Tree Vsualization with Tree-Maps: 2-d Space-Filling Approach, 1992; ACM, vol. 11, No. 1, pp. 92-99 (Year: 1992).*

(Continued)

*Primary Examiner* — Phenuel S Salomon
(74) *Attorney, Agent, or Firm* — Schwegman Lundberg & Woessner, P.A.

(57) ABSTRACT

Classification predictions made by a concept classifier may be interactively visualized and explored in a user interface that displays visual representations of a plurality of data items in a star coordinate space spanned by a plurality of anchor concepts each mapping the data items onto respective finite real-valued scores. Positions of the visual representations of the data items in the star coordinate space are based on the scores for the plurality of anchor concepts, and may be updated responsive to a user manipulating the anchor concepts in the user interface, e.g., by moving or modifying definitions of anchor concepts, or by adding or deleting anchor concepts. The visual representations may of the data items may reflect labels and/or classification predictions, and may be updated based on updated classification predictions following retraining the of the concept classifier based on added training data or new features.

24 Claims, 5 Drawing Sheets

(56) References Cited

U.S. PATENT DOCUMENTS

| | | | | |
|---|---|---|---|---|
| 2005/0169529 | A1* | 8/2005 | Owechko | G06K 9/469 382/190 |
| 2005/0234955 | A1* | 10/2005 | Zeng | G06F 16/355 |
| 2008/0086431 | A1* | 4/2008 | Robinson | A63F 13/12 706/11 |
| 2009/0086720 | A1* | 4/2009 | Westlake | H04L 12/66 370/352 |
| 2010/0082751 | A1* | 4/2010 | Meijer | G06F 15/16 709/206 |
| 2011/0103682 | A1* | 5/2011 | Chidlovskii | H04L 51/32 382/159 |
| 2011/0184896 | A1* | 7/2011 | Guyon | G06K 9/6269 706/12 |
| 2012/0137367 | A1* | 5/2012 | Dupont | G06F 21/00 726/25 |
| 2013/0254153 | A1* | 9/2013 | Marcheret | G06N 7/00 706/59 |
| 2013/0307992 | A1* | 11/2013 | Erlandsson | H04N 5/332 348/164 |
| 2015/0019204 | A1* | 1/2015 | Simard | H04L 1/0079 704/9 |

OTHER PUBLICATIONS

Amershi, et al., "Power to the People: The Role of Humans in Interactive Machine Learning", In Publication of AI Magazine, vol. 35, Issue 4, Dec. 22, 2014, 23 Pages.

Attenberg, et al., "Beat the Machine: Challenging Humans to Find a Predictive Model's "Unknown Unknowns"", In Journal of Data and Information Quality, vol. 6, Issue 1, Mar. 4, 2015, 17 Pages.

Attenberg, et al., "Why label when you can search?: alternatives to active learning for applying human 7 resources to build classification models under extreme class imbalance", In Proceedings of 16th ACM SIGKDD International Conference on Knowledge Discovery and Data Mining, Jul. 25, 2010, 10 Pages.

Shneiderman, Ben, "Tree Visualization with Tree-maps: 2-d Space-filling Approach", In Proceedings of ACM Transactions on Graphics, vol. 11, Issue 1, Jan. 1992, pp. 92-99.

Settles, Burr, "Active learning", In Journal of Synthesis Lectures on Artificial Intelligence and Machine Learning, vol. 6, Issue 1, Jun. 2012, 116 Pages.

Meek, Christopher, "A Characterization of Prediction Errors", In Journal of the Computing Research Repository, Nov. 18, 2016, 9 Pages.

Collins, et al., "Retrieval Time from Semantic Memory", In Journal of verbal learning and verbal behaviour, vol. 8, Issue 2, Apr. 1, 1969, pp. 240-247.

Reisberg, Daniel, "The Oxford handbook of cognitive psychology", In Publication of Oxford University Press, Jun. 2013, 58 Pages.

Dhillon, et al., "Concept decompositions for large sparse text data using clustering", In Journal of Machine learning, vol. 42, Issue 1, Jan. 1, 2001, pp. 143-175.

Dobsa, et al., "Concept decomposition by fuzzy k-means algorithm", In Proceedings of IEEE/WIC International Conference on Web Intelligence, Oct. 13, 2003, pp. 684-688.

Fails, et al., "Interactive Machine Learning", In Proceedings of the 8th international conference on Intelligent user interfaces, Jan. 12, 2003, pp. 39-45.

Murphy, Gregory, "The Big Book of Concepts", In Publication of MIT Press, Jan. 2004, 2 Pages.

Jandot, et al., "Interactive Semantic Featuring for Text Classification", In Journal of Computing Research Repository, Jun. 24, 2016, pp. 51-55.

Kulesza, et al., "Structured labeling for facilitating concept evolution in machine learning", In Proceedings of SIGCHI Conference on Human Factors in Computing Systems, Apr. 26, 2014, pp. 3075-3084.

Lakkaraju, et al., "Identifying Unknown Unknowns in the Open World: Representations and Policies for Guided Exploration", In Proceedings of Thirty-First AAAI Conference on Artificial Intelligence, Feb. 4, 2017, pp. 2124-2132.

Lee, et al., "IVisClustering: An Interactive Visual Document Clustering via Topic Modeling", In Journal of Computer Graphics Forum, vol. 31, Part 3, Jun. 2012, pp. 1155-1164.

Lewis, et al., "A sequential algorithm for training text classifiers", In Proceedings of the 17th annual international ACM SIGIR conference on Research and development in information retrieval, Aug. 1, 1994, 10 Pages.

Lewis, et al., "Heterogeneous uncertainty sampling for supervised learning", In Proceedings of Eleventh International conference on machine learning, Jul. 9, 1994, pp. 148-156.

Nosofsky, M. Robert., "Attention, similarity, and the identification-categorization relationship", In Journal of experimental psychology: General, vol. 115, Issue 1, Mar. 1986, pp. 39-57.

Hoffman, Patrick E., "Table visualizations: a formal model and its applications", In PhD Thesis of University of Massachusetts, Retrieved on: Oct. 31, 2017, 239 Pages.

Ren, et al., "Squares: Supporting Interactive Performance Analysis for Multiclass Classifiers", In Journal of IEEE transactions on visualization and computer graphics, vol. 23, Issue 1, Jan. 2017, 10 Pages.

Sokal, Robert R., et al., "A Statistical Method for Evaluating Systematic Relationships", The University of Kansas Science Bulletin, vol. 38, Pt. II, No. 22, Mar. 20, 1958, pp. 1409-1438.

Yi, et al., "Dust & magnet: multivariate information visualization using a magnet metaphor", In Journal of Information Visualization, vol. 4, Issue 4, Dec. 2005, pp. 239-256.

Stumpf, et al., "Interacting meaningfully with machine learning systems: Three experiments", In International Journal of Human-Computer Studies, vol. 67, Issue 8, Aug. 31, 2009, pp. 1-32.

Talbot, et al., "EnsembleMatrix: Interactive Visualization to Support Machine Learning with Multiple Classifiers", In Proceedings of the SIGCHI Conference on Human Factors in Computing Systems, Apr. 4, 2009, pp. 1283-1292.

Tulving, Endel, "Episodic and semantic memory", In Publication of Academic Press, Jun. 3, 1972, pp. 381-403.

Ware, et al., "Interactive machine learning: letting users build classifiers", In International Journal of Human-Computer Studies, vol. 55, Issue 3, Sep. 2001, 281-292.

* cited by examiner

INTERACTIVE SEMANTIC DATA EXPLORATION FOR ERROR DISCOVERY

BACKGROUND

Interactive machine learning is a growing field in machine learning that emphasizes building models with humans in the loop. Unlike traditional machine learning workflows, where (bulk) data labeling, featurizing, and modeling happen in a sequential pipeline, interactive machine learning allows model developers to iteratively explore and label data, add features to fix errors, and/or modify models to enhance performance. Since the models constantly get feedback from humans, their evolving directions can align better and/or faster with the model developers' goals. Interactive machine learning is especially useful for building models for concept classifiers, as humans usually possess knowledge about the target concept. By exploring an unlabeled dataset and discovering errors or inconsistencies in predictions made by the classifier model (as trained based on a labeled training dataset), humans can come up with hypotheses for sub-concepts that are challenging to the model and try to fix problems by providing more labeled data items and/or adding features. Human involvement in model building and training can, however, be time-consuming and costly, and asking humans, for instance, to provide an exhaustive list of sub-concepts is unrealistic. It is therefore important to design the interactive machine learning process carefully to utilize human efforts effectively and maximize the value of each interaction.

A common approach in interactive machine learning involves the selection of unlabeled data items for presentation to and labeling by a human, who is in essence treated as an "oracle." This process can be machine-initiated, utilizing an algorithm to sample the unlabeled dataset, e.g., randomly or based on the uncertainty associated with a classifier's prediction. In the latter case, preference in the selection is usually given to data items with high uncertainly (i.e., items whose assigned prediction scores are near the decision boundary). Although these sampling methods can help discover potential errors, they are unlikely to reveal "unknown unknowns," that is, erroneous predictions that the classifier makes with high confidence, which can have disastrous consequences in some classification tasks (e.g., in the context of discovering hate speech on the internet). By contrast, in a human-initiated search for data items to be labeled, the human searcher can be tasked specifically with finding the unknown unknowns, and thereby "beat the machine." This approach has been implemented with some success using crowdsourcing in the "open world" (i.e., for an unlimited unlabeled dataset) in a game-like setting with monetary incentives to identify misclassified items and, particularly, confidently misclassified items. However, the process lacks a framework for leveraging the efforts expended by a searcher in subsequent searches for errors, and is thus of limited efficiency.

SUMMARY

This summary section is provided to introduce aspects of embodiments in a simplified form, with further explanation of the embodiments following in the detailed description. This summary section is not intended to identify essential or required features of the claimed subject matter, and the particular combination and order of elements listed in this summary section is not intended to provide limitation to the elements of the claimed subject matter.

This disclosure relates to a software tool, used in the context of developing concept classifiers through interactive supervised machine learning, that assists humans with data exploration and error discovery by interactively visualizing the data and associated classifications in a semantically meaningful way. In accordance with various embodiments, data items are displayed in a user interface, individually and/or clustered by similarity, within a semantic space defined, or "spanned," by "anchor concepts" that can be created and manipulated by the user. These anchor concepts may be designed to capture and externalize concepts formed in a user's mind that the user deems useful for classifying a data item as positive or negative for the target concept of the concept classifier (and such anchor concepts are herein also referred to as "sub-concepts" of the target concept), or, more generally, to organize or filter the data items in some meaningful way. Anchor concepts may be defined by the user, e.g., in terms of one or more example data items designated as belonging to the respective anchor concept, and may be refined by the addition of data items to or the deletion of data items from the anchor concept as the anchor concept evolves in the user's mind. Alternatively, anchor concepts may be defined explicitly by one or more words forming a "dictionary" for the anchor concept, in terms of another classifier model (separate from the concept classifier for the target concept), or programmatically. In general, an anchor concept maps data items onto finite, real-valued scores (e.g., in the range from 0 to 1) that quantify some property of the data items, such as, e.g., their relatedness to a given topic (which may be the target concept) or their length (e.g., as measured in terms of the number of tokens in a text).

The semantic space spanned by the anchor concepts may be visually represented as a "star coordinate space." In a star coordinate space, the coordinate axes—herein corresponding to the anchor concepts—emanate radially from a common center. Star coordinate representations generally (but not necessarily) map a multidimensional conceptual space onto a lower-dimensional space. For instance, to visualize the semantic space spanned by n anchor concepts in two geometric dimensions, the anchor concepts may be arranged on a circle in a plane to define n respective radial coordinate axes. The n scores assigned to a data item by the n anchor concepts constitute the coordinates of that data item along the respective axes. The geometric vectors from the center of the circle to the coordinates along the axes are averaged over all anchor concepts to determine the position of the data item in the disc bounded by the circle. The two-dimensional star coordinate representation, thus, maps the n-dimensional vector defined with respect to the anchor concepts onto a two-dimensional geometric vector in the plane (inherently causing some ambiguity in the representation, as the star coordinate axes are not mutually orthogonal). In accordance with various embodiments, the user interface allows the user to rearrange the anchor concepts along the circle and, based on his observation of the resulting movement of data items in the plane, optimally spread out the data items, e.g., to tease apart sub-concepts.

The dataset displayed in the user interface may generally include labeled data items (i.e., data items that have been manually classified as positive or negative for the target concept, which may include the training data used to train the classifier model) as well as unlabeled data items. Visual representations of the data items within the star coordinate space, e.g., in the form of symbols, may discriminate between labeled and unlabeled data items by their attributes, e.g., using different symbol shapes or colors for labeled and unlabeled data items. The attributes of the visual representations may also reflect the classifications of the data item by their respective labels or, for unlabeled data, the respective predictions made by the concept classifier. In some embodiments, prediction scores computed by the concept classifier are displayed for both labeled and unlabeled data items, in the star coordinate space (e.g., as textual labels of the visual representations) or separately. For example, the user interface may include, alongside an "exploration pane" showing the dataset in the star coordinate space, an "items detail pane" that lists the data items visually represented in the star coordinate space, or a subset thereof, e.g., in the form of thumbnail images with associated prediction scores, and optionally ordered by prediction score. The user may select a data item from the list, or in the exploration pane, to view its contents and label the data item (if previously unlabeled, or to correct a previously assigned incorrect label). Upon assignment of a label, the respective data item may be added to the training dataset (or, in the case of a label correction, the new label may be substituted for the old label), and the concept classifier may be retrained based on the updated training set. The visual representations of the data items can then be updated to reflect updated predictions by the concept classifier.

In some embodiments, to avoid cluttering the exploration pane if the number of data items is large, data items may be algorithmically clustered, e.g., based on pairwise similarity in a bag-of-words space (or some other similarity metric), and the clusters, rather than their constituent individual data items, may be displayed in the star coordinate space. The position of the cluster is the vector average (or center-of-mass) position of the data items therein. In a hierarchical clustering scheme, clusters and individual data items at any given level in the hierarchy may be displayed together, visually distinguished by the attributes of their visual representations, and a user may navigate into any of the clusters to update the user interface to display the data items contained within the cluster. Further, a snapshot of the composition of a cluster may be provided in a treemap-style square, e.g., consisting (up to annotations and the like) of four rectangular regions that reflect, by their relative sizes, the numbers of data items within the cluster that are labeled positive, labeled negative, unlabeled and predicted positive, and unlabeled and predicted negative, respectively.

The user interface described herein allows a user to explore the dataset via the creation and manipulation of anchor concepts and the more detailed study of selected individual data items and/or clusters. Such exploration may allow and serve to discover (actual or potential) prediction errors made by the concept classifier—including, in particular, unknown unknowns—and improve the classifier performance by labeling erroneously predicted items and/or, in some instances, add on to the feature set used by the concept classifier. (An "actual prediction error" or "actual classification error" is an erroneous classification of a labeled data item as reflected in an inconsistency between the classifier's prediction and the label. A "potential prediction/classification error," by contrast, is a prediction made for an as yet unlabeled data item that the user deems erroneous, and which may or may not be corrected upon addition of that data item and user-assigned label to the training set and retraining of the classifier.) In searching for errors and, correspondingly, items to label, the user may look, for example, for outliers in position or classification (such as individual data items positioned apart from a denser cloud of items, or positively predicted data items in a cloud of negatively labeled items), discrepancies between predictions and labels within a cluster of similar data items (e.g., a cluster containing labeled items predominantly classified as positive and unlabeled items predominantly predicted as negative), discrepancies between local and global cluster distributions, or contradictions between the classification of the data item(s) defining an anchor concept and the classification of data items in the vicinity of that anchor concept. Beneficially, by allowing the user to semantically decompose the dataset via the anchor concepts, human ability to understand relations between the target concept and sub-concepts is more fully leveraged to guide the user's search for errors and to aid, especially, in the discovery of sub-concepts for which the classifier has no features. As a result, some embodiments can achieve higher discovery rates for unknown unknowns (e.g., caused by "feature blindness," i.e., absence from the feature set of a feature that is important for the classifier model to effectively learn from the training data) than conventional algorithmic sampling methods and/or greater efficiency than crowdsourcing approaches to human-initiated error search.

Accordingly, in one aspect, one or more machine-readable media store instructions for execution by one or more hardware processors, the instructions, when executed by the one or more hardware processors, causing the one or more hardware processors to perform operations for interactively visualizing predictions made by a concept classifier trained for a target concept. The operations include causing display, in a user interface, of visual representations of a plurality of data items in a star coordinate space spanned by a plurality of anchor concepts, each anchor concept mapping the data items onto respective finite real-valued scores, wherein positions of the visual representations of the data items in the star coordinate space are based on the scores for the plurality of anchor concepts, and wherein attributes of the visual representations of the data items discriminate between labeled and unlabeled data items and reflect data item classifications as labeled or as predicted by the concept classifier, respectively. Further, the operations include, responsive to user manipulation of the anchor concepts in the user interface, updating the positions of the visual representations of the data items in the star coordinate space, and, responsive to user selection and labeling of one or more of the data items in the user interface, retraining the concept classifier and updating the attributes of the visual representations of the data items based on updated predictions by the retrained concept classifier.

In some embodiments, the operations further include, responsive to user selection of one of the anchor concepts as a feature for making predictions, retraining the concept classifier with an updated feature set comprising the selected anchor concept, and updating the attributes of the visual representations of the data items based on updated predictions by the retrained concept classifier. Also, user manipulation of the anchor concepts may include adding an anchor concept to or removing an anchor concept from the plurality of anchor concepts spanning the star coordinate space. The concept classifier may, in some embodiments, utilize the anchor concepts as features in making predictions, and, in this case, the operations may further include, responsive to addition or removal of an anchor concept, retraining the classifier and updating the attributes of the visual representations of the data items based on updated predictions by the retrained concept classifier.

The anchor concepts may be visually arranged on a circle, and user manipulation of the anchor concepts may include changing a position of an anchor concept along the circle, whereupon positions of the visual representations of the data items in the star coordinate space are changed. In some embodiments, the positions of the visual representations of the data items are further based on weights assigned to the anchor concepts, and user manipulation of the anchor concepts further includes modifying the weights, whereupon positions of the visual representations of the data items in the star coordinate space are changed.

In some embodiments, at least some of the anchor concepts are each defined by one or more data items designated as belonging to the respective anchor concept. User manipulation of the anchor concepts may include, in this case, modifying an anchor concept by adding a data item to the data items defining the anchor concept or removing a data item from the data items defining the anchor concept. For at least one of the anchor concepts, the data items belonging thereto may be labeled positive or negative for the target concept and determine, by majority voting, a label of that anchor concept. Each of the anchor concepts defined by data items belonging thereto may map the data items displayed in the star coordinate space onto the respective scores based on a measure of similarity of the respective data items to the data items belonging to the anchor concept. The measure of similarity may be or include, e.g., cosine similarity in a bag-of-words space. In some embodiments, at least some of the anchor concepts are defined by respective anchor dictionaries each comprising one or more words.

The visual representations of the data items may use combinations of symbol shape and color attributes to visually discriminate between items labeled positive for the target concept, items labeled negative for the target concept, items predicted positive for the target concept by the concept classifier, and items predicted negative for the target concept by the concept classifier. In some embodiments, the operations further include displaying, in the user interface, visual representations of one or more clusters of data items, wherein, for each of the clusters, the position of the visual representation of that cluster within the star coordinate space is based on an average position of the data items contained within the cluster. The clusters may be formed, for example, based on cosine similarity between pairs of data items in a bag-of-words space. Upon user selection of one of the one or more clusters, the selected cluster may be visualized as a treemap-style square comprising regions representing numbers of the data items within the cluster that are labeled positive, labeled negative, predicted positive, and predicted negative, respectively, for the target concept. Upon user selection of one of the one or more clusters, a list of the data items contained within the selected cluster may be displayed, and/or the user interface may be updated to display visual representations of the data items contained within the selected cluster in the star coordinate space.

The operations may further include displaying, in the user interface, a list of at least a subset of the plurality of data items. The data items in the list may be visually represented, for instance, by thumbnails. Upon selection of one of the data items by a user, contents of the data item may be displayed in the user interface and user labeling of the data item may be facilitated.

In another aspect, a method for interactive exploration of data and classification predictions made by a concept classifier trained for a target concept is provided. The method includes displaying, in a user interface, visual representations of a plurality of data items in a star coordinate space spanned by a plurality of anchor concepts each mapping the data items to respective finite real-valued scores, wherein positions of the visual representations of the data items are based on the scores for the plurality of anchor concepts and wherein attributes of the visual representations of the data items discriminate between labeled and unlabeled data items and reflect data item classifications as labeled or as predicted by the concept classifier, respectively. Further, the method includes, by a user, manipulating the anchor concepts in the user interface by at least one of moving, modifying a definition of, adding, or removing an anchor concept; responsive to user manipulation of the anchor concepts in the user interface, updating the positions of the visual representations of the data items in the star coordinate space; by the user, inspecting the positions and attributes of the visual representations of the data items to discover outliers, inspecting contents of data items identified as outliers or associated with discrepancies to discover a misclassified unlabeled data item, and, upon such discovery, labeling the misclassified data item for inclusion in updated training data; and, responsive to user labeling of the data item, by a hardware processor executing machine-readable instructions, retraining the concept classifier based on the updated training data and updating predictions by the retrained concept classifier, and causing the attributes of the visual representations of the data items to be updated in the user interface based on the updated predictions. The method may further include, upon discovery of a misclassified labeled data item, modifying a feature set used by the concept classifier.

In yet another aspect, a system for interactively visualizing predictions made by a concept classifier trained for a target concept includes one or more hardware processors and one or more machine-readable media storing instructions for execution by the one or more hardware processors. The instructions, when executed by the one or more hardware processors, cause the one or more hardware processors to perform operations comprising: causing display, in a user interface, of visual representations of a plurality of data items in a star coordinate space spanned by a plurality of anchor concepts, each anchor concept mapping the data items onto a finite real-valued score, wherein positions of the visual representations of the data items in the star coordinate space are based on the scores for the plurality of anchor concepts, and wherein attributes of the visual representations of the data items discriminate between labeled and unlabeled data items and reflect data item classifications as labeled or as predicted by the concept classifier, respectively; responsive to user manipulation of the anchor concepts in the user interface, updating the positions of the visual representations of the data items; and, responsive to user selection and labeling of one or more of the data items, retraining the concept classifier and updating the attributes of the visual representations of the data items based on updated predictions by the retrained concept classifier.

BRIEF DESCRIPTION OF THE DRAWINGS

The foregoing will be more readily understood from the following detailed description of various embodiments, in particular, when taken in conjunction with the accompanying drawings.

DETAILED DESCRIPTION

This disclosure describes a user interface for the interactive visualization and exploration of data classified for a given target concept, as well as the use of that user interface in the context of a larger system and workflow for building a concept classifier through supervised machine learning. For the sake of clarity, the description focuses on binary classification, i.e., the classification of data items as either positive or negative for a single target concept. One of skill in the art given the benefit of the instant disclosure will appreciate, however, that the principles and general methodology discussed herein can be extended to multinomial classification tasks that involve two or more target concepts.

Figure 1A:
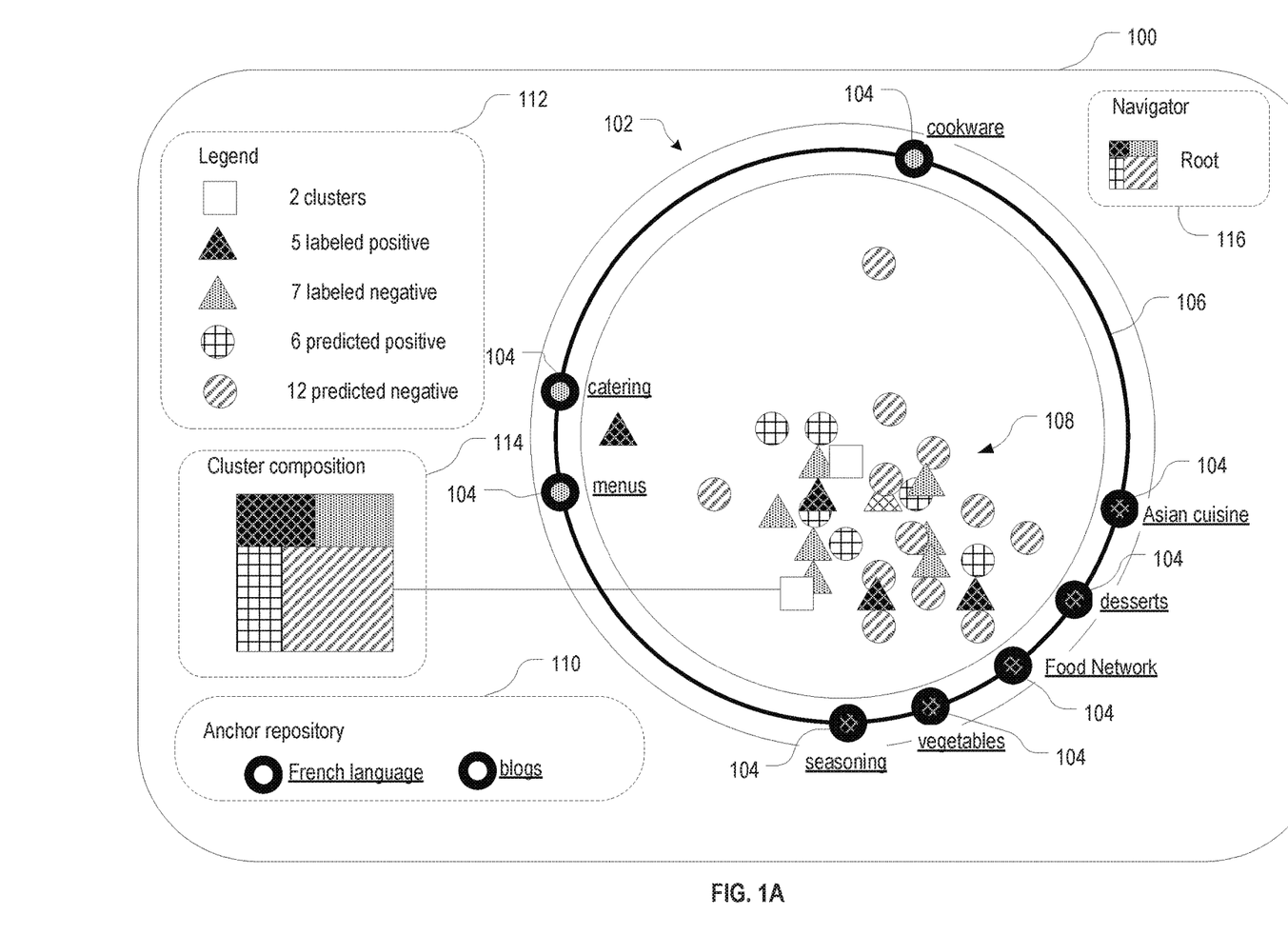
FIG. 1A is a user interface diagram depicting a set of data items spread out in a star coordinate space spanned by a plurality of anchor concepts in an exploration pane, in accordance with one embodiment.
Figure 1B:
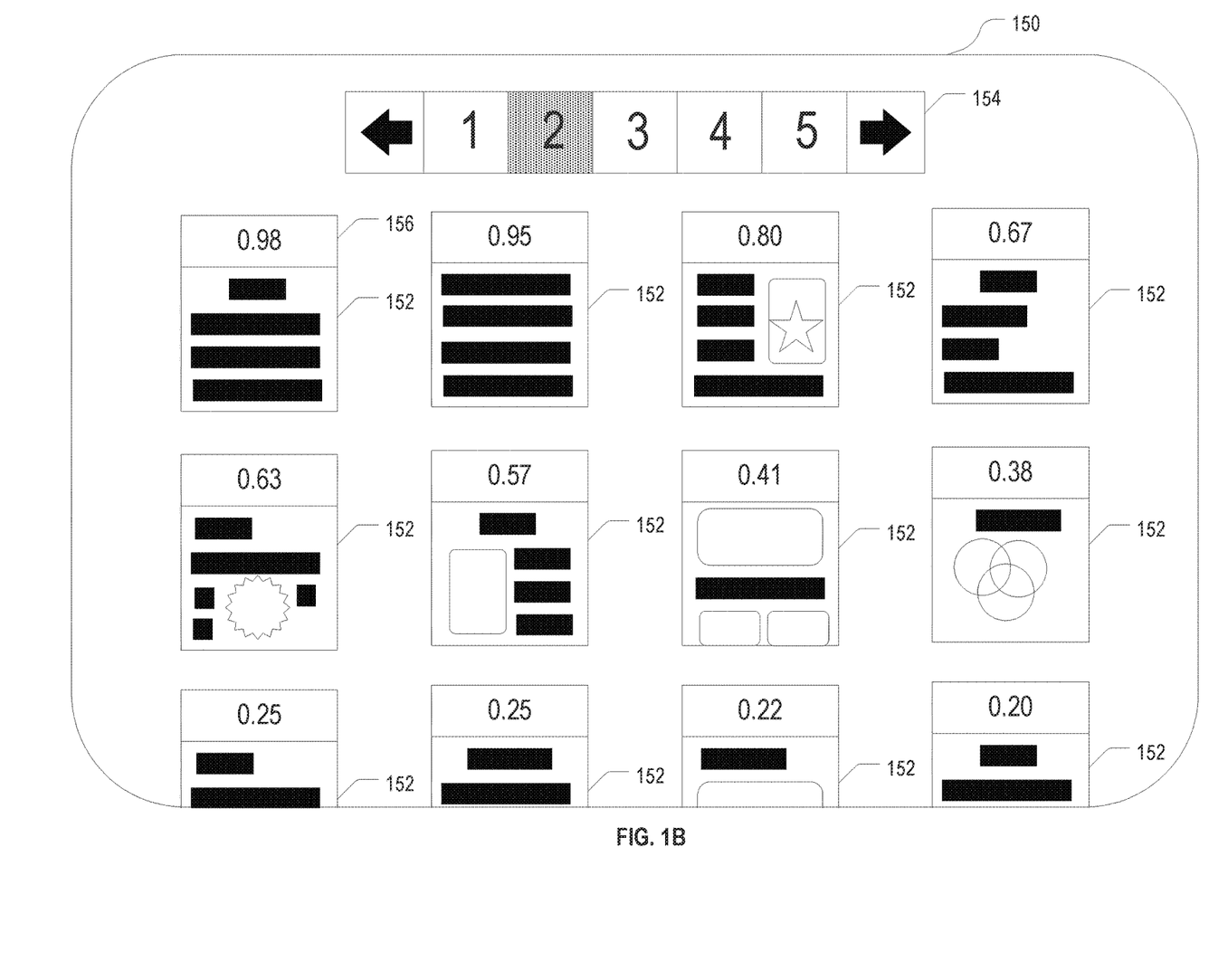
FIG. 1B is a user interface diagram depicting a list of data items in an items detail pane, in accordance with one embodiment.

FIGS. 1A and 1B are user interface diagrams illustrating an example embodiment of a user interface for interactive data visualization and exploration. In this embodiment, the user interface includes (at least) two panes: an exploration pane 100 (shown in FIG. 1A) and an items detail pane 150 (shown in FIG. 1B). The exploration pane 100 displays a star coordinate space 102 spanned by anchor concepts 104 (shown as rings) arranged on a circle 106. Denoting the radius of the circle as r and the azimuth associated with a given anchor concept k (i.e., the angle enclosed between rays from the center of the circle in the positive horizontal (x-) direction and from the center of the circle to the anchor concept k, respectively) as $\theta_k$, the position of anchor concept k relative to the center of the circle can be described by a Cartesian vector $\vec{V}_k = (r \cdot \cos \theta_k, r \cdot \sin \theta_k)$. Interior to the circle 106, data items 108 (pointed to in the aggregate in FIG. 1A), visually represented by various symbols, are displayed. The positions of the data items 108 depend on the positions of the anchor concepts 104 and some property of the data items 108 measured by the anchor concepts 104, such as, for one example type of anchor concept, the similarity of the data items 108 to the anchor concepts 104. Metaphorically speaking, the anchor concepts 104 attract data items 108 with respective forces quantified by finite, real-valued scores onto which the anchor concepts 104 map the data items 108 (or, put differently, scores which the anchor concepts 104 assign to the data items 108). Denoting the score assigned to data item i by anchor concept k as $s_k(i)$, the position vector $\vec{r}(i)$ of data item i may be calculated as the normalized vector sum over the anchor-concept vectors $\vec{V}_k$ each multiplied by the respective score $s_k(i)$:

$$\vec{r}(i) = \frac{1}{s(i)} \sum_k s_k(i) \cdot \vec{V}_k,$$

where $s(i) = \sum_k s_k(i)$.

The anchor concepts may further have associated weights $w_k$ that determine their relative strengths. The weighted score assigned to data item i by anchor concept k is denoted by $f(w_k, s_k(i))$, which is a calibration function that is strictly monotonic and increasing in both $s_k(i)$ and $w_k$. In this (more general) case, the position vector $\vec{r}(i)$ of data item i is:

$$\vec{r}(i) = \frac{1}{s(i)} \sum_k f(w_k, s_k(i)) \cdot \vec{V}_k, \text{ where } s(i) = \sum_k f(w_k, s_k(i)).$$

For a semantic space defined by n anchor concepts, the respective scores assigned to a given data item collectively constitute an n-dimensional conceptual vector for the data item within the semantic space. While the star coordinate space 102 in FIG. 1A maps this n-dimensional vector onto a two-dimensional geometric vector, as is convenient for display on a screen, other geometric representations are generally possible. In a three-dimensional star coordinate representation, for example, the anchor concepts are arranged on a sphere, and the n-dimensional vector of coordinates with respect to the anchor concepts is mapped onto a three-dimensional position in the ball bounded by that sphere. Such a three-dimensional (3D) star coordinate representation may be visualized on a two-dimensional medium (such as on screen or on paper) using known 3D-visualization techniques (e.g., involving perspective views). Rather than representing the n-dimensional semantic space defined by the anchor concepts by mapping it in its entirety onto a geometric space, it is also possible to display projections into sub-spaces. A user interface may, for example, be configured to allow a user to pivot between multiple facets each corresponding to a two-dimensional sub-space spanned by two of the anchor concepts.

Anchor concepts 104 may be defined to measure any property of interest of the data items 108. In some embodiments, a number of anchor concepts 104 are each defined in terms of one or more associated example data items (which may be, but need not necessarily be, taken from the set of data items 108 displayed in the star coordinate space 102), and the scores measure a degree of similarity between the anchor concepts 104 and the data items 108. For example, in the context of developing a concept classifier for documents (such as, e.g., web pages) containing food recipes, anchor concepts 104 may be defined by groups of documents related to sub-concepts that might help discriminate between recipe and non-recipe documents. In the example of FIG. 1A, such groups for sub-concepts include documents related to seasoning, desserts, Asian cuisine, or, as examples of documents that do not contain recipes despite overlapping with recipe pages in many keywords, catering or restaurant menus. To measure the similarity of the data items 108 to the various anchor concepts 104, both the data items 108 and the anchor concepts may be represented as vectors in a bag-of-words space, that is, a space whose dimensions correspond to the words in the "bag," and where the vector components of any data item 108 reflect the multiplicities (numbers of occurrences) of the words in that data item 108. The bag-of-words vector of an anchor concept 104 may be computed as the component-wise average of the bag-of-words vectors of its associated example data items. With this representation, a suitable metric of similarity between a data item 108 and an anchor concept 104 is the cosine similarity between their respective bag-of-words vectors, that is, the scalar product between the bag-of-words vectors, normalized by the lengths of the vectors. As an alternative to the use of example data items, anchor concepts 104 capturing certain topics of documents may be defined directly by a set of keywords (which thereby form an "anchor dictionary"), and the score for a data item may be computed based on the presence or absence (and, optionally, multiplicity) of these keywords in the data item.

Anchor concepts may also serve to measure other properties of data items. The length of documents may be of interest, for example, because of a correlation of length and a certain thematic target concept (recipes, for instance, tend to be rather short) or because the target concept is one that relates more directly to length (as is the case, for instance, with a concept classifier for summaries, which are characterized by their brevity). To discriminate between long and short documents, or attract documents of a specified length, anchor concepts may be defined using a suitable mathematical function of the length of the document (e.g., measured in number of words) that has a value range from 0 to 1; suitable functions may include, e.g., a sigmoid or Gaussian function (with appropriate offsets and scaling factors). As yet another example, an anchor concept may also be defined based on a separate classifier model (that is, a classifier model other than the concept classifier being tested and evaluated using the exploration pane 100). For some target concepts, it may be of interest to know, for instance, whether a data item reflects positive or negative sentiments. An anchor concept for this purpose may score data items based on the output of a classifier model that performs sentiment analysis. Many other kinds and categories of anchor concepts may occur to those of ordinary skill in the art. In general, any method by which data items can be assigned a finite-valued (and hence normalizable) score may be used to define an anchor concept. The anchor concepts may correlate, by design, with the target concept (positively or negatively); in fact, anchor concepts can be utilized, in some embodiments, as features evaluated by the concept classifier. However, correlation with the target concept is not necessary in every instance. Anchor concepts may also work as filters, or be used to organize and understand data in some other way. For example, when developing a concept classifier for some thematic target concept, it may be beneficial to filter out data items in languages other than the language (e.g., English) in which the concept classifier operates, and one or more anchor concepts for such foreign languages may serve this purpose. An anchor concept may also be used to collect data items that a user is not ready to label. For example, a user may be uncertain whether blogs on cooking are to be considered recipes, and postpone the decision by temporarily collecting all blogs with a "blogs" anchor concept. When used as a filter, the anchor concept may become obsolete once the data items it attracts have been removed from the star coordinate space 102, rendering the removal of the anchor concept itself desirable. In this case, or in any other situation where a user may want to eliminate an anchor concept 104 from the star coordinate space 102, the anchor concept may be moved to an anchor repository 110, where it may be stored for potential future use.

The visual representations of the data items 108 may encode, by their visual attributes (such as symbol shape, color, fill pattern, line style, text labels or the like), whether a data item is labeled or unlabeled, and/or whether it is positive or negative for the target item. For example, in FIG. 1A, labeled data items are depicted with triangular symbols, whereas unlabeled data items are shown as circles. Further, among the labeled data items, those labeled positive have a tilted grid fill pattern and those labeled negative have a dotted fill pattern. Among the unlabeled data items, a grid fill pattern indicates a classifier prediction as positive for the target concept and a diagonal hatch indicates a predication as negative. (In a color display, different colors may be substituted for the different fill patterns for greater ease of viewing and interpreting the visualization.) A legend 112 in the exploration pane 100 maps the different symbol styles to the respective data categories. Beyond visually encoding qualitative categories, the symbols representing the data items may also be accompanied by quantitative prediction scores (not shown), which may be displayed continuously on or near the respective symbols, or pop up upon, e.g., clicking on or hovering over a symbol. Although visual discrimination between labeled versus unlabeled and positive versus negative data items is particularly useful for data exploration in accordance herewith, it will be appreciated that the visual attributes of the representations of the data items may also reflect other kinds of categorizations and values associated with the classification of the data items. Visual attributes may serve, for instance, to highlight labeled data items that are predicted erroneously (i.e., inconsistently with the label), or to encode, in a gray scale or color scale, the confidence score associated with predictions made by the concept classifier. Other uses of visual attributes may occur to those of ordinary skill in the art.

In various embodiments, the anchor concepts 104 likewise visually reflect the categorizations applied to the data items. For anchor concepts 104 defined in terms of example data items, for instance, labels assigned to the individual example data items can be used to determine, by majority voting, an overall label for that anchor concept (that is, the overall label is positive/negative if more than half of the individual example data items associated with the anchor concept are positive/negative, and a special rule may be applied in case of a tie). Alternatively, a user may, upon creating an anchor concept 104, manually label that anchor concept 104 as positive or negative for the target concept. FIG. 1A shows several anchor concepts 104 filled with a tilted grid pattern, indicating a positive label, and a few anchor concepts 104 filled with a dotted pattern, indicating a negative label. Anchor concepts 104 may also reflect, alternatively to labels, an overall prediction determined by majority voting from the predictions for the example data items (or, instead, by averaging over prediction scores associated with the example data items).

In many usage scenarios, the number of individual data items in the dataset to be visualized is too large to be displayed at once in the user interface without excessively cluttering the presentation. To address this issue, various embodiments involve (automatically) grouping data items into clusters based on similarity, and representing a cluster as a whole with a symbol in the star coordinate space 102. In FIG. 1A, clusters are depicted as hollow squares. The position of a cluster within the star coordinate space 102 is the average of the positions of its constituent data items:

$$\vec{r}_{cluster} = \frac{1}{|cluster|} \sum_i \vec{r}(i)$$

where |cluster| is the number of items within the cluster. The composition of a cluster may be visualized in a treemap-style square, e.g., as shown in a cluster composition field 114. The treemap-style square represents the various categories of data items in the clusters by rectangular regions that visually encode the category (e.g., as shown in FIG. 1, using different fill patterns consistent with the legend 112 to discriminate between data items labeled positive, labeled negative, predicted positive, and predicted negative) and that are sized in proportion to the number of data items in the cluster within each respective category. The cluster composition field 114 may show the composition of the most recently selected cluster (e.g., a cluster clicked by the user in the star coordinate space 102). Alternatively, space permitting, the user interface may show treemap-style squares for multiple selected or even all of the clusters. The clustering may be hierarchical, and may result, at any cluster level in the hierarchy, in the existence of individual data items along with clusters of items. The root cluster at the top of the hierarchy corresponds to the dataset in its entirety. The user interface may allow users to navigate through the hierarchy to display, at any selected cluster level, the individual data items and/or (sub-)clusters contained therein. The currently displayed level may be indicated in a navigator field 116. In FIG. 1A, the navigator field 116 shows that the current display is for the root cluster level of the hierarchy. As can be seen, the navigator field 116 may also show the composition of the cluster level, e.g., in the form of a treemap-style square.

Clustering based on similarity may be accomplished in various ways and using various distance metrics. In one embodiment, for instance, similarity between a pair of data items is measured in terms of a distance in a bag-of-words space, such as the normalized scalar product (or cosine similarity) between the two bag-of-words vectors. For any given distance metric $d(x, y)$ between two individual data items, the distance $d(C_a, C_b)$ between two clusters $C_a$ and $C_b$ may be defined, at the lowest level of the clustering hierarchy, as the average distance between pairs of individual data items among the two clusters (i.e., pairs $(x, y)$ with $x \in C_a$ and $y \in C_b$), and, at any level, recursively as the average distance between pairs of sub-clusters $C_{ai}, C_{bj}$ (which may include single-item clusters) among the clusters (i.e., pairs $(C_{ai}, C_{bj})$ with $C_{ai} \in C_a$ and $C_{bj} \in C_b$):

$$d(C_a, C_b) = \frac{\sum_i \sum_j d(C_{ai}, C_{bj})}{|C_a| \cdot |C_b|},$$

where $|C_a|$ and $|C_b|$ are the numbers of items in clusters $C_a$ and $C_b$, respectively. In accordance with one embodiment, clustering may proceed iteratively in a binary fashion, with a clustering algorithm selecting in each iteration, among all possible pairs of clusters, the two clusters having the shortest distance therebetween, and then merging these two clusters into a new cluster. The result of such hierarchical clustering is a binary tree of hierarchical clusters, that is, a tree that divides into two branches at each node. To facilitate more efficient data exploration, the binary tree may be reorganized into an n-ary tree (i.e., a tree branching into up to n branches at each internal node). The reorganization process may proceed from the root node at the top of the tree downward, expanding the tree in breath-first order by substituting sibling nodes with their respective children. The value of n may be chosen based on the size of the dataset to render the visualization neither too cluttered nor too sparse.

The exploration pane 100 allows users to interactively explore the dataset, using anchor concepts 104 to dynamically spread out the data items 108. In accordance with some embodiments, users can create new anchor concepts 104 from example data items. The user interface may, for instance, allow a user to drag a selected data item onto the circle 106 to thereby create an anchor concept 104. Alternatively or additionally, the user interface may provide, upon selection of a data item (e.g., by right-click), a (pop-up) menu with a "create-anchor" option. Once an example-based anchor concept 104 has been created, its definition can be modified by adding example data items to or removing example data items from the anchor concept 104. In embodiments that use other, non-example-based kinds of anchor concepts 104, those anchor concepts 104 may be created by allowing a user to directly specify, for example, a set of keywords (or "anchor dictionary"), a function, or a classifier model defining the anchor concept 104. In addition to defining anchor concepts 104 (which determines how the anchor concepts 104 map data items 108 onto finite real-valued scores), users may also be allowed to name the anchor concepts 104 to capture the semantic concepts they represent, and those names may be displayed in the visualization. In FIG. 1A, for example, anchor concepts 104 have been named "seasoning," "vegetables," "Food Network," and so forth. As the meaning of an anchor evolves in the user's mind, the name may be adjusted. Further, to tease apart sub-concepts of a target concept, or generally to contrast or associate anchor concepts 104 and the data items they attract, users may manipulate the locations of the anchor concepts 104 along the circle 106 (e.g., by dragging a selected anchor concept 104). A user may, for instance, want to collect all anchor concepts 104 that appear to be positively correlated with a target concept on one side of the circle 106, and place anchor concepts 104 that appear to be negatively correlated with the target concept on the opposite side of the circle 106. Anchor concepts 104 may also be placed on top of one another to study their combined effect. In addition, to adjust the relative strengths of the anchor concepts 104, the user may assign or modify weights associated with the anchor concepts 104. To be able to test different combinations of anchor concepts 104, the user may move anchor concepts 104 off the star coordinate space 102 and, e.g., into the anchor repository 110, and/or restore anchor concepts 104 from the anchor repository 110 to the star coordinate space 102.

Turning now to FIG. 1B, the items detail pane 150 provides the user access to information about the individual data items, including their contents. The selection of data items shown in the items detail pane 150 may be coupled with the exploration pane 100. For example, the item details pane 150 may contain, at any given time, all data items currently visualized in the exploration pane 100. When the user navigates, in the exploration pane 100, into a cluster, or filters data items in some manner, the items detail pane 150 may update automatically to show only items visible in the exploration pane 100. In one embodiment, data items from a dataset of documents are presented as a grid of thumbnail images 152 of the individual documents, as shown in FIG. 1B. In other embodiments, the data items may be represented as a list, e.g., of textual descriptions or links to the data items (such as, in a dataset of web pages, links to the web pages). To accommodate more data items than can be fit on a single screen, the items detail pane 150 may be paginated, as reflected by the pagination control bar 154 displayed in FIG. 1B.

In association with the thumbnail images 152 or other representations of the individual data items, further information about the respective data items may be displayed; such information may include, e.g., the prediction scores assigned by the classifier (as shown as element 156) and/or associated confidence scores, the human-assigned labels (indicating whether an item is positive or negative for the target concept), anchor concepts to which the data items are attracted, and the like. The thumbnail images 152 or other representations of the data items may be ordered by the prediction score (as shown in FIG. 1B), or by some other parameter. Upon clicking on one of the data items, the user may be able to view further detail (e.g., in the case of web pages or other documents, a full-scale view of the document), label the data items, and/or create an anchor concept from the data item (or associate the data item with an existing anchor concept).

In some embodiments, user access to individual data items may also be provided via the exploration pane 100. Upon selection of a data item 108 in the exploration pane 100, the user may, for instance, be allowed to view the contents of the data item and/or its associated prediction score and (if existent) label, and to assign a label to an unlabeled data item or correct a label of an already labeled data item. Selection of a cluster of data items may allow the user to view a list of items within the cluster and/or the general composition of the cluster (which may be updated, e.g., in cluster composition field 114), or to navigate into the selected cluster within the star coordinate space 102.

The user interface depicted in FIGS. 1A and 1B can be beneficial for data exploration in the context of interactively building a concept classifier. Given a set of features (i.e., functions that map data items onto scalar real values) to be used for a given classification task, a concept classifier generates classification predictions (e.g., for a binary classifier, in the form of prediction scores in conjunction with a decision boundary that demarcates positive and negative predictions for the target concept) for data items based on their associated feature values. In other words, a classifier is a function that maps sets of feature values onto respective prediction scores. In supervised machine learning, a learning algorithm is employed to try and determine a target classification function (i.e., one that makes correct predictions) within a defined space of "learnable" classification functions based on a training dataset of (e.g., manually) labeled data items. Learning algorithms suitable for classification tasks include, for example, logistic regression, (e.g., deep) artificial neural networks, and support vector machines. The space of learnable classification functions can be thought of as a set of classification functions with adjustable parameters (e.g., the weights of an artificial neural network) whose values are to be learned from the training dataset, usually by minimizing a cost function that measures the discrepancy between the (e.g., manually assigned) labels and the predictions generated from the feature values.

Various sources of errors can cause the concept classifier returned by the learning algorithm for a given training dataset and feature set to suffer from both actual prediction errors (also referred to as "training errors"), that is, incorrect predictions of data items within the training dataset, and potential prediction errors (also referred to as "generalization errors"), that is, incorrect predictions of data items that are not in the training dataset (and are, in that sense, unlabeled). Apart from mislabeling of data items in the training dataset, these error sources can be grouped into learner errors, representation errors, and boundary errors (the latter also sometimes referred to as "ignorance errors"). Boundary errors are generally due to insufficient training data, and can be remedied by labeling and adding data items (including, in particularly, mispredicted data items) to the training dataset. Representation errors arise if there is no learnable classification function of the feature set that correctly predicts all data items in the training dataset, e.g., due to an insufficient feature set (also called "feature blindness") or an impoverished space of functional forms to choose from. Learner errors result from an inability of the learning algorithm to identify the correct classification function, even if it exists in the space of learnable classification functions. In accordance with various embodiments, learner errors can be excluded by using a learning algorithm known to be "consistent," meaning that it returns a classification function that correctly predicts all items in the training dataset if such a classification function exists within the space of learnable functions; logistic regression is one example of a consistent learning algorithm. Feature blindness and boundary errors are corrected, in interactive classifier building approaches as discussed herein, by allowing users to iteratively add labeled data items to the training dataset and features to the feature set.

Figure 2:
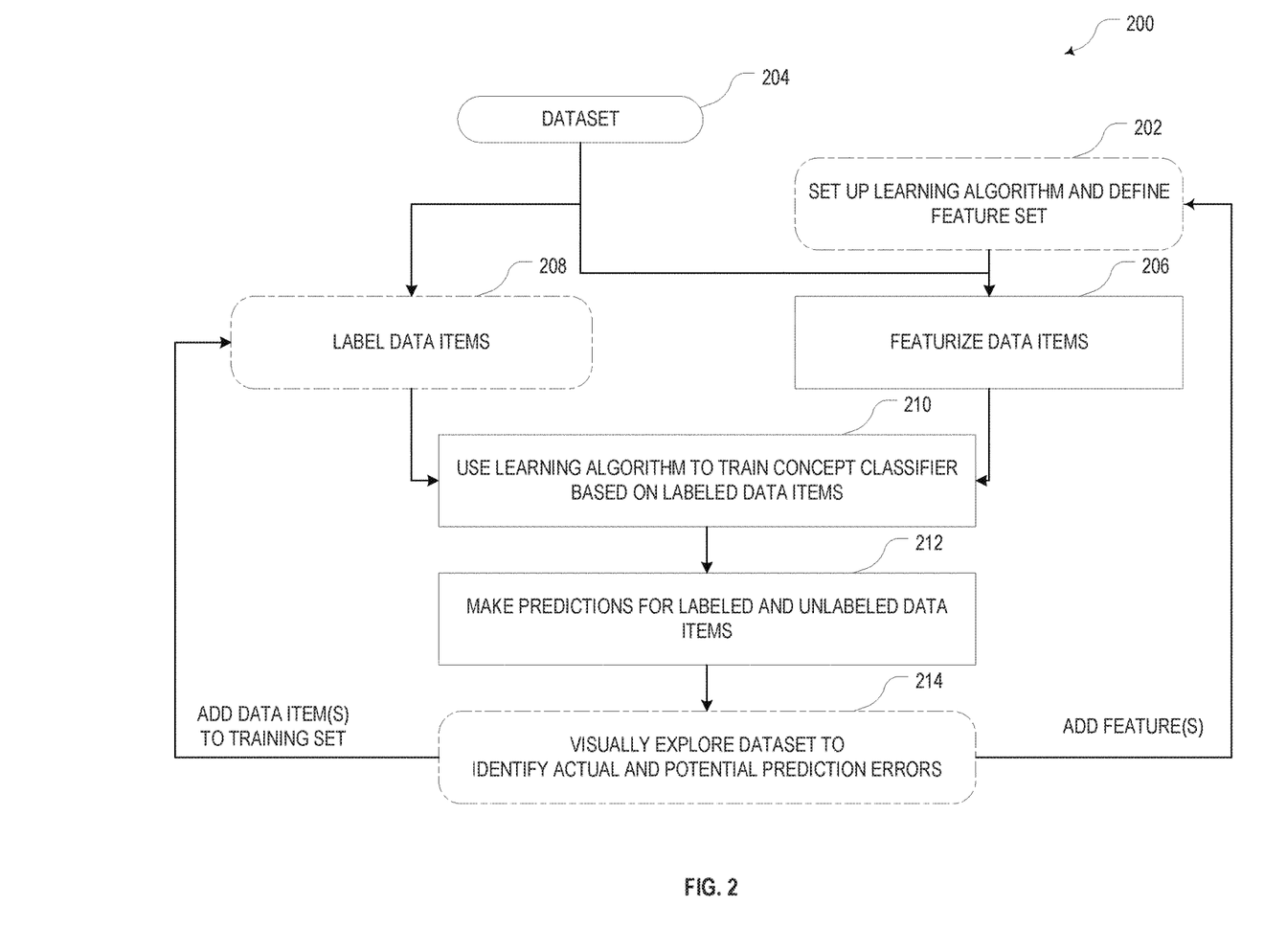
FIG. 2 is a flow chart illustrating an example workflow for interactive classifier model building in accordance with one embodiment.

FIG. 2 is a flow chart illustrating an example method 200 for interactive classifier model building in accordance with one embodiment. Operations performed by humans or including human input are indicated in FIG. 2 with broken lines and rounded corners to distinguish them from computer-performed operations (shown with solid lines and sharp corners). The method 200 involves setting up a learning algorithm and defining a feature set to be used in the classification (operation 202). The data items within a dataset 204 provided as input to the method 200 can then be "featurized," i.e., their respective feature values can be computed (operation 206). Further, to form a training dataset, a subset of the data items in dataset 204 are labeled, e.g., by manually classifying them (in the case of a binary classifier, as either positive or negative for the target concept) (operation 208). The learning algorithm is then used to "train" the concept classifier model, that is, to select a classification function and/or set the values of its adjustable parameters, based on the labeled data items and their associated sets of feature values (operation 210). The trained concept classifier model can be used to make classification predictions for unlabeled as well as labeled data items (operation 212), and the results can be inspected by a human model developer to discover actual and potential prediction errors (operation 214); the user interface of FIGS. 1A and 1B may serve visual data exploration for this purpose. To improve the performance of the classifier model and correct discovered errors, the human model developer can add labeled data items to the training set and/or features to the feature set. The method 200 may continue in a loop until the desired classifier performance is achieved.

Figure 3:
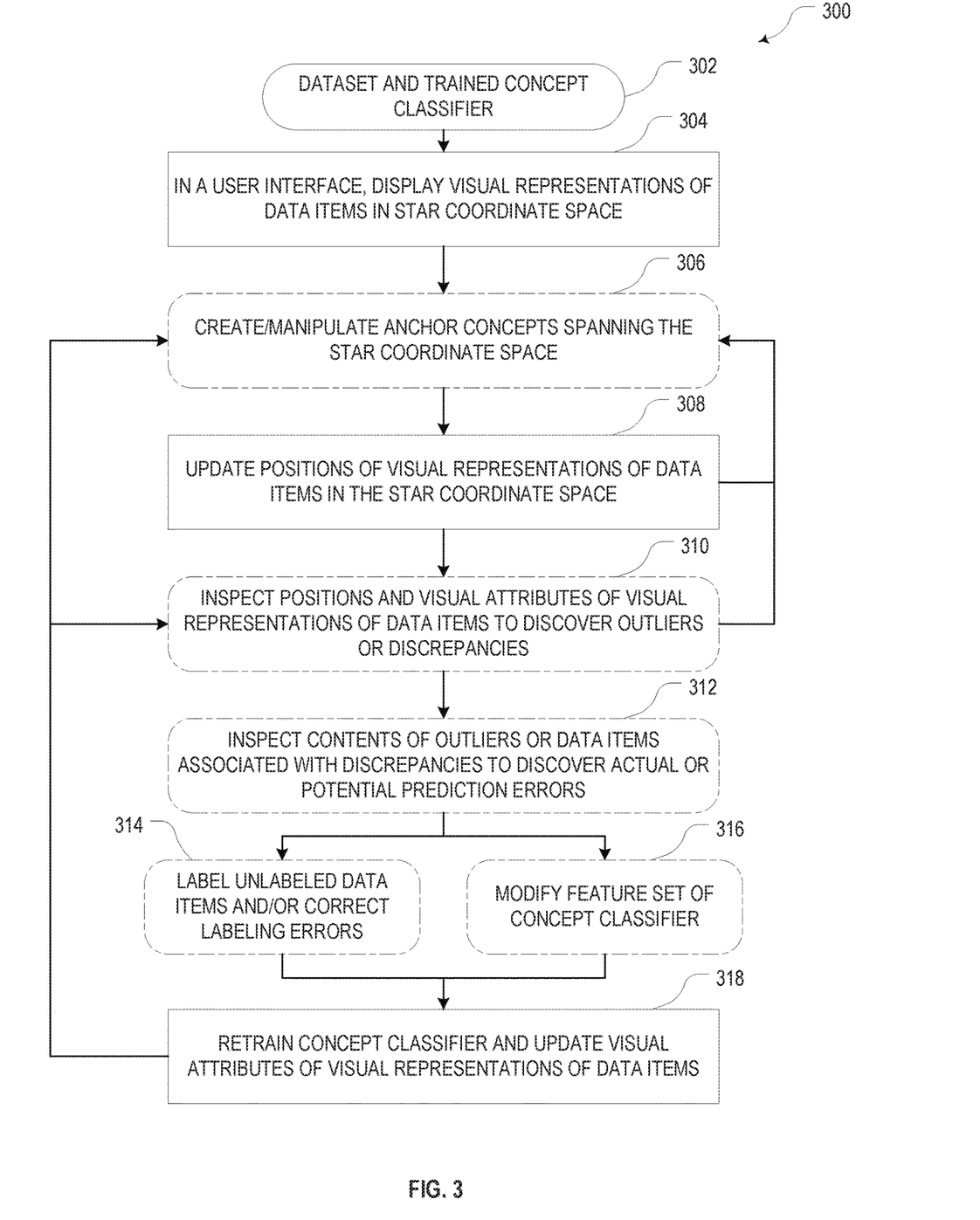
FIG. 3 is a flow chart illustrating an example workflow for interactive semantic data exploration and error discovery in accordance with one embodiment.

Going now into more detail on the visual exploration of the data (operation 214), the flow chart of FIG. 3 illustrates an example method 300 for interactive semantic data exploration and error discovery in accordance with one embodiment. As in FIG. 2, operations performed by a user are indicated with broken lines and rounded corners. Starting point 302 of the method 300 is a dataset that generally includes both labeled and unlabeled data in conjunction with an already trained concept classifier (as it may result, e.g., from operations 202-210 shown in FIG. 2). The method 300 involves displaying (operation 304), in a user interface (such as the exploration pane 100 of FIG. 1A), visual representations of the data items 108 in a star coordinate space 102 spanned by anchor concepts 104 that can be created and/or manipulated (in operation 306) by the user. As illustrated in FIG. 1A, the visual representations may be, for instance, symbols, and may encode, in combinations of symbol shape, color, and other visual attributes, whether an item is labeled or predicted positive or negative for the target concept.

At the beginning of a visualization session, prior to creation of any (new) anchor concepts 104 by the user, the data may be located at the center of the star coordinate space 102 (optionally slightly spread out as a cloud for visibility), or spread out based on anchor concepts from a previous session or based on default anchor concepts (such as, in one simple embodiment, anchor concepts separating positively and negatively predicted items based on the prediction scores). Any such default anchor concepts may be removed by the user, or automatically, as the user creates new anchor concepts. The user may create anchor concepts 104, e.g., from example data items as discussed above, or in some other manner. Once created, the user can manipulate an anchor concept by modifying its definition or, put differently, the manner in which it scores the data item (e.g., for example-based anchor concepts, by adding or removing examples from the anchor concept), by changing the position of the anchor concept 104 (e.g., moving it to a new position along the circle 106), and/or by adjusting a weight associated with the anchor concept 104—all of these manipulations affect the computation of the positions of the data items in the star coordinate space 102. Accordingly, following any such manipulation or the creation of a new anchor concept 104 (operation 306), the positions of the visual representations of the data items 108 are updated in the star coordinate space 102 (operation 308). In addition, the user may name the anchor concepts to persist the user's notion of what they represent. By creating and manipulating anchor concepts 104 and observing the resulting movement of the data items 108, the user can spread, dissect, group, map out and visually organize the data items in a semantically meaningful way.

The visualization of the data items in star coordinates corresponding to anchor concepts, along with the visual encoding of labels and predictions, further facilitates error discovery. Strategies that can be employed by the user for error discovery, include, in particular, the inspection of the positions and visual attributes of the visual representations of the data items (or clusters) in search for outliers or discrepancies (operation 310), followed by the more detailed inspection of the contents of the data items (or clusters) associated with such outliers or discrepancies (operation 312). Conditions that may prompt a closer look by the user include, for example, outliers in position (e.g., data items positioned away from a denser cloud of items); outliers in labels or prediction classes (as reflected by the visual attributes) within a group of data items positioned in the same general region of the star coordinate space (e.g., a positively labeled item within a cloud of negatively predicted items or vice versa, a positively predicted item within a cloud of negatively predicted items or vice versa, a positively labeled item within a cloud of negatively predicted items, etc.); and discrepancies in distributions (e.g., a cloud of data items whose fraction of labeled data items is significantly lower than the fraction of labeled data items in the dataset at large, or other discrepancies between local and global distributions; a large number of positively predicted data items in the vicinity of predominantly negatively labeled data items, or other discrepancies between labels and predictions in the ratios of positive/negative classifications). For clusters of data items, the cluster composition may provide an additional tool for discovering discrepancies.

Beneficially, the exploration of a dataset using anchor concepts in accordance herewith can facilitate the discovery of errors that are otherwise hard to discern. While actual errors (reflected in a contradiction between label and classifier prediction), for example, can straightforwardly be listed out, finding potential prediction errors within a large set of unlabeled data items is inefficient absent some criterion to focus the search. The confidence associated with a prediction, which can be quantified in a confidence score and generally increases the farther away a prediction score is from the decision boundary, can be a useful criterion. However, looking for data items with a low confidence score helps discover merely "known unknowns" of the classifier model (i.e., data items the classifier model "knows" it does not know how to predict, or, put differently, which can be algorithmically identified based on their prediction scores or confidence scores in conjunction with a suitable threshold). For the discovery of "unknown unknowns," which the classifier model predicts with high confidence, albeit incorrectly, the confidence score is not useful. Such unknown unknowns often arise from feature blindness or other representation errors. The use of anchor concepts to tease apart sub-concepts associated with a target concept can help discover feature blindness and define or refine features to be used by the concept classifier. For example, if a certain anchor concept tends to attract incorrectly predicted items, or a group of positively labeled and negatively predicted unlabeled data items (or vice versa), this may be an indication that the anchor concept captures some characteristic of the data that may be useful as a feature. Even apart from finding errors, clustering data items based on similarity or spreading them based on anchor concepts can serve to efficiently select data items for labeling and addition to the dataset. An anchor concept may, for instance, attract a group of data items only few (if any) of which are labeled, indicating that this group is underrepresented in the training dataset. Exploring the dataset as described herein can also help the user discover types of example data items that he did not even know existed, and which he would therefore not have thought of adding to the training set.

With renewed reference to FIG. 3, once the inspection of a data item, e.g., as prompted by discovery of an outlier or discrepancy, has revealed an actual or potential prediction error (in operation 312), the user may provide additional input to the learning algorithm by labeling data items for addition to the training dataset (or, in the case of discovered mislabeling errors, by correcting the label) (operation 314) and/or by adding features to or otherwise modifying the feature set used by the concept classifier (operation 316). The concept classifier is then retrained based on the expanded training dataset and/or modified feature set, and the visual attributes of the visual representations of the data items are updated to reflect updated classification predications and/or labels (operation 318). The user may continue the process of manipulating anchors (operation 306), inspecting data in the aggregate and individually (operations 310, 312), and providing feedback to the concept classifier (operations 314, 316) in, generally, any order to explore the dataset and improve the concept classifier.

As the user iteratively assesses and develops the concept classifier, the type of user input provided to the learning algorithm may depend on the type of error discovered, and may follow a certain sequence. For example, upon discovery of a potential prediction error—that is, an as yet unlabeled data item whose predicted classification appears incorrect to the user—the user may first label and add the data item to the training dataset (operation 314). In case of a boundary error, adding the data item to the training set will fix the error, meaning that, following the retraining of the concept classifier, the predicated classification will be correct and consistent with the label. If the user, upon renewed inspection of the data item in the updated visualization, discovers, however, that the now labeled data item is still incorrectly predicted, this may be an indication of a feature blindness error, which the user may try to correct by adding a suitable feature to the feature set (operation 316).

The anchor concepts, inasmuch as they map data items onto real-valued scores, may themselves serve as features or candidates for features used by the classifier. In some embodiments, the user may have the option of actively selecting an anchor concept for use as a feature in the feature set, thereby triggering retraining of the classifier. In other embodiments, anchor concepts may, upon their creation and optionally based on certain specified criteria, automatically be added to the feature set. This may make sense especially for anchor concepts that are associated positively or negatively with the target concept, in the sense that similarity of data items to the anchor concept correlates (positively or negatively) with the classification prediction. The automatic addition of an anchor concept to a feature set may be conditioned on some criterion designed to ensure that a sufficient correlation exists. For example, a correlation coefficient between classification predication scores of data items and scores assigned to the data items by an anchor concept may be compared against a specified threshold, and trigger use of the anchor concept as a feature if the threshold is exceeded. As another example, for an example-based anchor concept, the average prediction scores or labels of the data items associated with the anchor may be used to decide whether the anchor concept should be used as a feature.

The methods 200, 300 for building concept classifiers and exploring datasets can be implemented with a suitable combination of hardware and software, for instance, in accordance with some embodiments, one or more (e.g., general-purpose) computers including one or more hardware processors for executing software instructions and one or more machine-readable media storing the instructions as well as the data on which they operate (such as raw data items, labels, features, prediction scores, etc.). The overall functionality may be organized into multiple software tools, components, or modules. For example, a software suite for building a concept classifier may include, in accordance with one embodiment, a model builder tool that that allows selecting and/or configuring a learning algorithm and defining a feature set, a featurizer component that processes data items to compute associated features in accordance with the defined feature set, a labeling user-interface component that presents the contents of data items to the user and receives user-assigned labels, a model trainer that executes the learning algorithm based on the labeled and featurized training data, and a visualization component that implements a user interface for exploring datasets using anchor concepts, e.g., as described with reference to FIGS. 1A and 1B. The visualization component itself may include various sub-components such as, for instance, a clustering component for clustering data items based on similarity, an anchor component for persisting definitions and properties of anchor concepts based on the user's input, a plotting component for computing the locations of the data items in the star coordinate space, and the like.

In general, the operations, algorithms, and methods described herein may be implemented in any suitable combination of software, hardware, and/or firmware, and the provided functionality may be grouped into a number of components, modules, or mechanisms. Modules and components can constitute either software components (e.g., code embodied on a non-transitory machine-readable medium) or hardware-implemented components. A hardware-implemented component is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented component that operates to perform certain operations as described herein.

In various embodiments, a hardware-implemented component can be implemented mechanically or electronically. For example, a hardware-implemented component can comprise dedicated circuitry or logic that is permanently configured (e.g., as a special-purpose processor, such as a field programmable gate array (FPGA) or an application-specific integrated circuit (ASIC)) to perform certain operations. A hardware-implemented component can also comprise programmable logic or circuitry (e.g., as encompassed within a general-purpose processor or other programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) can be driven by cost and time considerations.

Accordingly, the term "hardware-implemented component" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a general-purpose processor configured using software, the general-purpose processor can be configured as respective different hardware-implemented components at different times. Software can accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components can be regarded as being communicatively coupled. Where multiple such hardware-implemented components exist contemporaneously, communications can be achieved through signal transmission (e.g., over appropriate circuits and buses that connect the hardware-implemented components). In embodiments in which multiple hardware-implemented components are configured or instantiated at different times, communications between such hardware-implemented components can be achieved, for example, through the storage and retrieval of information in memory structures to which the multiple hardware-implemented components have access. For example, one hardware-implemented component can perform an operation and store the output of that operation in a memory device to which it is communicatively coupled. A further hardware-implemented component can then, at a later time, access the memory device to retrieve and process the stored output. Hardware-implemented components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions. The components referred to herein can, in some example embodiments, comprise processor-implemented components.

Similarly, the methods described herein can be at least partially processor-implemented. For example, at least some of the operations of a method can be performed by one of processors or processor-implemented components. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS). For example, at least sonic of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a component, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 4:
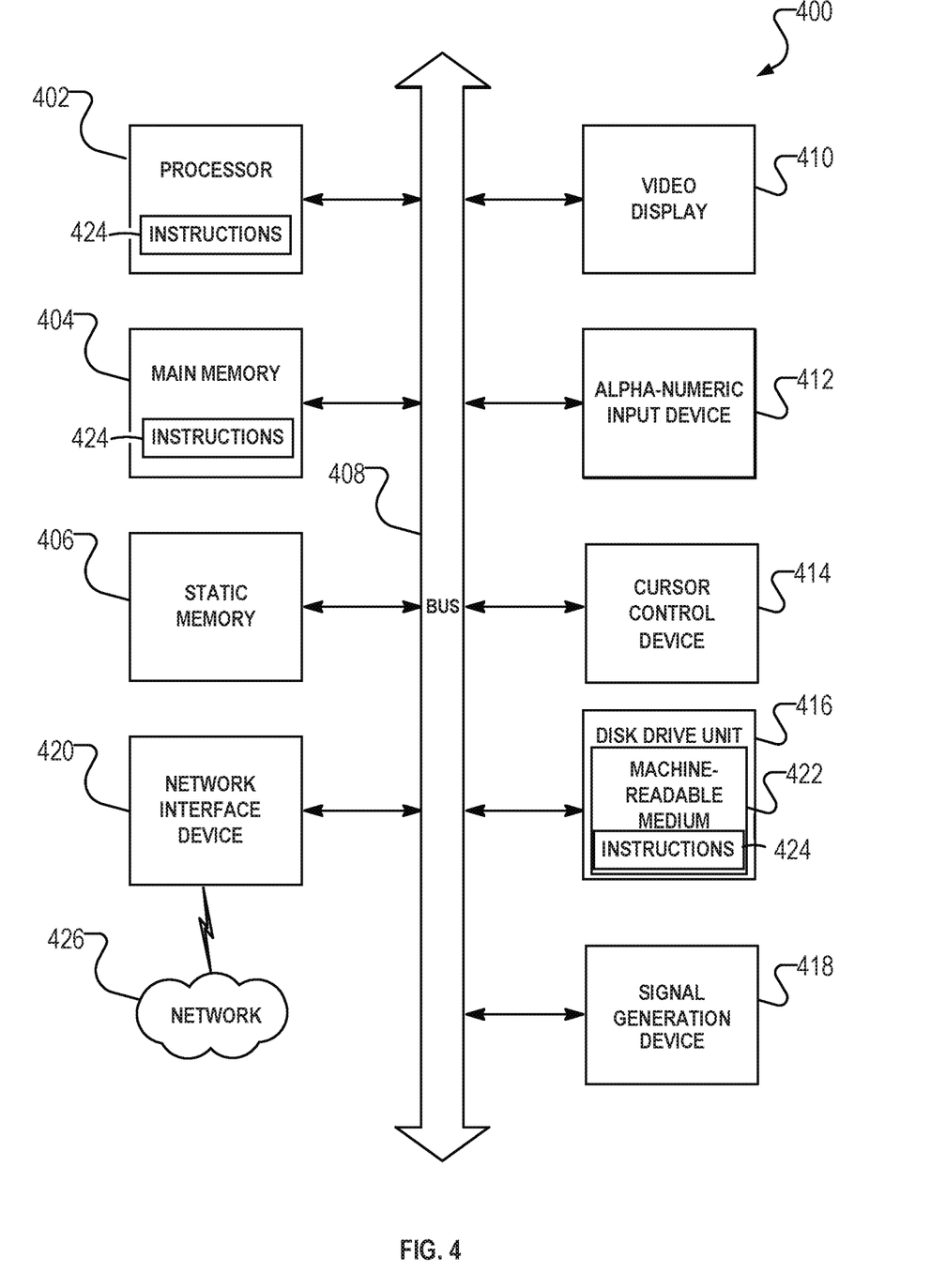
FIG. 4 is a block diagram of an example computer system within which instructions to implement user interfaces and methods for data exploration and error discovery may be executed, in accordance with various embodiments.

FIG. 4 is a block diagram of a machine in the example form of a computer system 400 within which instructions 424 may be executed to cause the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU), or both), a main memory 404, and a static memory 406, which communicate with each other via a bus 408. The computer system 400 can further include a video display 410 (e.g., a liquid crystal display (LCD) or a cathode ray tube (CRT)). The computer system 400 also includes an alpha-numeric input device 412 (e.g., a keyboard or a touch-sensitive display screen), a user interface (UI) navigation (or cursor control) device 414 (e.g., a mouse), a disk drive unit 416, a signal generation device 418 (e.g., a speaker), and a network interface device 420.

The disk drive unit 416 includes a machine-readable medium 422 on which are stored one or more sets of data structures and instructions 424 (e.g., software) embodying or utilized by any one or more of the methodologies or functions described herein. The instructions 424 can also reside, completely or at least partially, within the main memory 404 and/or within the processor 602 during execution thereof by the computer system 400, with the main memory 404 and the processor 402 also constituting machine-readable media.

While the machine-readable medium 422 is shown in an example embodiment to be a single medium, the term "machine-readable medium" can include a single medium or multiple media (e.g., a centralized or distributed database, and/or associated caches and servers) that store the one or more instructions 424 or data structures. The term "machine-readable medium" shall also be taken to include any tangible medium that is capable of storing, encoding, or carrying instructions 424 for execution by the machine and that cause the machine to perform any one or more of the methodologies of the present disclosure, or that is capable of storing, encoding, or carrying data structures utilized by or associated with such instructions 424. The term "machine-readable medium" shall accordingly be taken to include, but not be limited to, solid-state memories, and optical and magnetic media. Specific examples of machine-readable media 422 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 424 can be transmitted or received over a communication network 426 using a transmission medium. The instructions 424 can be transmitted using the network interface device 420 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi and WiMax networks). The term "transmission medium" shall be taken to include any intangible medium that is capable of storing, encoding, or carrying instructions 424 for execution by the machine, and includes digital or analog communications signals or other intangible media to facilitate communication of such software.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. One or more machine-readable media storing instructions for execution by one or more hardware processors, the instructions, when executed by the one or more hardware processors, causing the one or more hardware processors to perform operations for interactively visualizing predictions made by a concept classifier trained for a target concept, the operations comprising:
   causing display, in a user interface, of visual representations of a plurality of data items in a star coordinate space spanned by radial coordinate axes corresponding to a plurality of anchor concepts, the star coordinate space mapping a semantic space spanned by the plurality of anchor concepts into a geometric space, each anchor concept mapping the data items onto respective finite real-valued scores that quantify a property of the data items, wherein positions of the visual representations of the data items in the star coordinate space are based on the scores for the plurality of anchor concepts, and wherein attributes of the visual representations of the data items discriminate between labeled and unlabeled data items and reflect data item classifications as labeled or as predicted by the concept classifier, respectively;
   responsive to user manipulation of the star coordinate space by manipulation of the anchor concepts in the user interface, updating the positions of the visual representations of the data items in the star coordinate space; and
   responsive to user selection and labeling of one or more of the data items in the user interface, retraining the concept classifier and updating the attributes of the visual representations of the data items based on updated predictions by the retrained concept classifier.

2. The one or more machine-readable media of claim 1, wherein the operations further comprise, responsive to user selection of one of the anchor concepts as a feature for making predictions, retraining the concept classifier with an updated feature set comprising the selected anchor concept, and updating the attributes of the visual representations of the data items based on updated predictions by the retrained concept classifier.

3. The one or more machine-readable media of claim 1, wherein user manipulation of the anchor concepts comprises adding an anchor concept to or removing an anchor concept from the plurality of anchor concepts spanning the star coordinate space.

4. The one or more machine-readable media of claim 3, wherein the concept classifier utilizes the anchor concepts as features in making predictions, the operations further comprising, responsive to addition or removal of an anchor concept, retraining the classifier and updating the attributes of the visual representations of the data items based on updated predictions by the retrained concept classifier.

5. The one or more machine-readable media of claim 1, wherein the anchor concepts are visually arranged on a circle and wherein user manipulation of the anchor concepts comprises changing a position of an anchor concept along the circle, whereupon positions of the visual representations of the data items in the star coordinate space are changed.

6. The one or more machine-readable media of claim 1, wherein the positions of the visual representations of the data items are further based on weights assigned to the anchor concepts, and wherein user manipulation of the anchor concepts further comprises modifying the weights, whereupon positions of the visual representations of the data items in the star coordinate space are changed.

7. The one or more machine-readable media of claim 1, wherein at least some of the anchor concepts are each defined by one or more data items designated as belonging to the respective anchor concept.

8. The one or more machine-readable media of claim 7, wherein user manipulation of the anchor concepts comprises modifying an anchor concept by adding a data item to the data items defining the anchor concept or removing a data item from the data items defining the anchor concept.

9. The one or more machine-readable media of claim 7, wherein, for at least one of the anchor concepts, the data items belonging thereto are labeled positive or negative for the target concept and determine, by majority voting, a label of that anchor concept.

10. The one or more machine-readable media of claim 7, wherein each of the anchor concepts defined by data items belonging thereto maps the data items displayed in the star coordinate space onto the respective scores based on a measure of similarity of the respective data items to the data items belonging to the anchor concept.

11. The one or more machine-readable media of claim 10, wherein the measure of similarity comprises cosine similarity in a bag-of-words space.

12. The one or more machine-readable media of claim 1, wherein at least some of the anchor concepts are defined by respective anchor dictionaries each comprising one or more words.

13. The one or more machine-readable media of claim 1, wherein the visual representations of the data items use combinations of symbol shape and color attributes to visually discriminate between items labeled positive for the target concept, items labeled negative for the target concept, items predicted positive for the target concept by the concept classifier, and items predicted negative for the target concept by the concept classifier.

14. The one or more machine-readable media of claim 1, wherein the operations further comprise displaying, in the user interface, visual representations of one or more clusters of data items, wherein, for each of the clusters, the position of the visual representation of that cluster within the star coordinate space is based on an average position of the data items contained within the cluster.

15. The one or more machine-readable media of claim 14, wherein clusters are formed based on cosine similarity between pairs of data items in a bag-of-words space.

16. The one or more machine-readable media of claim 14, wherein the operations further comprise, upon user selection of one of the one or more clusters, visualizing the selected cluster as a treemap-style square comprising regions representing numbers of the data items within the cluster that are labeled positive, labeled negative, predicted positive, and predicted negative, respectively, for the target concept.

17. The one or more machine-readable media of claim 14, wherein the operations further comprise, upon user selection of one of the one or more clusters, displaying a list of the data items contained within the selected cluster.

18. The one or more machine-readable media of claim 14, wherein the operations further comprise, upon user selection of one of the one or more clusters, updating the user interface to display visual representations of the data items contained within the selected cluster in the star coordinate space.

19. The one or more machine-readable media of claim 1, wherein the operations further comprise displaying, in the user interface, a list of at least a subset of the plurality of data items.

20. The one or more machine-readable media of claim 19, wherein the data items in the list are visually represented by thumbnails.

21. The one or more machine-readable media of claim 1, wherein the operations further comprise, upon selection of one of the data items by a user, displaying contents of the data item in the user interface and facilitating user labeling of the data item.

22. A method for interactive exploration of data and classification predictions made by a concept classifier trained for a target concept, the method comprising:
displaying, in a user interface, visual representations of a plurality of data items in a star coordinate space spanned by radial coordinate axes corresponding to a plurality of anchor concepts, the star coordinate space mapping a semantic space spanned by the plurality of anchor concepts into a geometric space, each anchor concept mapping the data items to respective finite real-valued scores that quantify a property of the data items, wherein positions of the visual representations of the data items are based on the scores for the plurality of anchor concepts and wherein attributes of the visual representations of the data items discriminate between labeled and unlabeled data items and reflect data item classifications as labeled or as predicted by the concept classifier, respectively;
by a user, manipulating the star coordinate space by manipulation of the anchor concepts in the user interface, the manipulation of the anchor concepts comprising at least one of moving, modifying a definition of, adding, or removing an anchor concept;
responsive to user manipulation of the anchor concepts in the user interface, updating the positions of the visual representations of the data items in the star coordinate space;
by the user, inspecting the positions and attributes of the visual representations of the data items to discover outliers, inspecting contents of data items identified as outliers or associated with discrepancies to discover a misclassified unlabeled data item, and, upon such discovery, labeling the misclassified data item for inclusion in updated training data; and
responsive to user labeling of the data item, by a hardware processor executing machine- readable instructions, retraining the concept classifier based on the updated training data and updating predictions by the retrained concept classifier, and causing the attributes of the visual representations of the data items to be updated in the user interface based on the updated predictions.

23. The method of claim 22, further comprising, upon discovery of a misclassified labeled data item, modifying a feature set used by the concept classifier.

24. A system for interactively visualizing predictions made by a concept classifier trained for a target concept, the system comprising:
one or more hardware processors; and
one or more machine-readable media storing instructions for execution by the one or more hardware processors, the instructions, when executed by the one or more hardware processors, causing the one or more hardware processors to perform operations comprising:
causing display, in a user interface, of visual representations of a plurality of data items in a star coordinate space spanned by radial coordinate axes corresponding to a plurality of anchor concepts, the star coordinate space mapping a semantic space spanned by the plurality of anchor concepts into a geometric space, each anchor concept mapping the data items onto finite real-valued scores that quantify a property of the data items, wherein positions of the visual representations of the data items in the star coordinate space are based on the scores for the plurality of anchor concepts, and wherein attributes of the visual representations of the data items discriminate between labeled and unlabeled data items and reflect data item classifications as labeled or as predicted by the concept classifier, respectively;
responsive to user manipulation of the star coordinate space by manipulation of the anchor concepts in the user interface, updating the positions of the visual representations of the data items; and
responsive to user selection and labeling of one or more of the data items, retraining the concept classifier and updating the attributes of the visual representations of the data items based on updated predictions by the retrained concept classifier.

* * * * *